US012671960B2

(12) United States Patent
Ten Veldhuis et al.

(10) Patent No.: US 12,671,960 B2
(45) Date of Patent: Jun. 30, 2026

(54) DETERMINING PROXIMITY

(71) Applicant: Sonitor Technologies AS, Oslo (NO)

(72) Inventors: Mattheus Franciscus Albertus Ten Veldhuis, Oslo (NO); Endre Bakka, Oslo (NO); Cyril Antille, Oslo (NO); Wilfred Edwin Booij, Oslo (NO)

(73) Assignee: Sonitor Technologies AS, Oslo (NO)

( * ) Notice: Subject to any disclaimer, the term of this patent is extended or adjusted under 35 U.S.C. 154(b) by 607 days.

(21) Appl. No.: 18/011,969

(22) PCT Filed: Jul. 2, 2021

(86) PCT No.: PCT/GB2021/051694
§ 371 (c)(1),
(2) Date: Dec. 21, 2022

(87) PCT Pub. No.: WO2022/003373
PCT Pub. Date: Jan. 6, 2022

(65) Prior Publication Data
US 2023/0292088 A1     Sep. 14, 2023

(30) Foreign Application Priority Data
Jul. 3, 2020     (GB) .................................... 2010267

(51) Int. Cl.
*H04W 4/80*          (2018.01)
*H04L 51/58*         (2022.01)
(Continued)

(52) U.S. Cl.
CPC .......... *H04W 4/023* (2013.01); *H04L 67/568* (2022.05); *H04W 8/20* (2013.01)

(58) Field of Classification Search
CPC ......... H04W 4/023; H04W 4/80; H04W 8/20; H04L 51/58; H04L 67/568
(Continued)

(56) References Cited

U.S. PATENT DOCUMENTS 9,182,231 B2 *  11/2015  Skaaksrud ............... G05D 1/81
10,028,105 B1    7/2018  Swart
(Continued)

OTHER PUBLICATIONS

International Search Report mailed Oct. 5, 2021 for PCT Appl. No. PCT/GB2021/051694, 4 pages.
(Continued)

*Primary Examiner* — Jinsong Hu
(74) *Attorney, Agent, or Firm* — Sterne, Kessler, Goldstein & Fox P.L.L.C.

(57)          ABSTRACT
A method for determining proximity comprises sending a wireless signal from a first mobile tag (120a) of a plurality of mobile tags (120), the wireless signal communicating identification information associated with the first mobile tag (120a). The wireless signal is received at a second mobile tag (120b) of the plurality of mobile tags (120), and proximity data comprising the identification information is stored in a memory (127b) of the second mobile tag (120b). The proximity data is sent from the second mobile tag (120b) to a mobile communication device (110) using a first wireless protocol, is received at a mobile communication device (110), and is stored in a memory (117) of the mobile communication device (110). The proximity data is sent from the mobile communication device (110) to a server (130) using a second wireless protocol, and the proximity data is stored in a memory (137) of the server (130).

20 Claims, 5 Drawing Sheets

(51) Int. Cl.
| | | |
|---|---|---|
| *H04L 67/568* | (2022.01) | |
| *H04W 4/02* | (2018.01) | |
| *H04W 8/20* | (2009.01) | |

(58) Field of Classification Search
USPC ........................................................ 455/456
See application file for complete search history.

(56)             References Cited

U.S. PATENT DOCUMENTS

| | | | | |
|---|---|---|---|---|
| 10,621,164 | B1* | 4/2020 | Kain ..................... | G06F 16/215 |
| 10,990,922 | B1* | 4/2021 | Subramanian ....... | G06Q 10/087 |
| 2009/0201850 | A1* | 8/2009 | Davis ................... | G01S 5/0009 |
| | | | | 370/328 |
| 2013/0122807 | A1 | 5/2013 | Tenarvitz et al. | |
| 2013/0141233 | A1* | 6/2013 | Jacobs ................. | G08B 21/043 |
| | | | | 340/521 |
| 2016/0073352 | A1* | 3/2016 | Baron ................. | H04W 52/245 |
| | | | | 370/311 |
| 2016/0260301 | A1* | 9/2016 | Miller ................. | G06Q 10/087 |
| 2017/0006454 | A1* | 1/2017 | Salkintzis ............... | H04L 67/12 |
| 2019/0122174 | A1* | 4/2019 | Gil ..................... | G06Q 10/0833 |
| 2019/0156923 | A1* | 5/2019 | Kain ...................... | G06N 20/00 |
| 2020/0386848 | A1* | 12/2020 | Wirola ................ | G01S 5/02523 |
| 2021/0006652 | A1* | 1/2021 | Ledvina ................. | H04L 51/58 |
| 2021/0084448 | A1* | 3/2021 | Catalena ............... | H04W 4/029 |
| 2021/0120371 | A1* | 4/2021 | Klinkner ............... | H04W 4/029 |
| 2021/0235230 | A1* | 7/2021 | Amir ..................... | G01S 5/0258 |
| 2021/0382158 | A1 | 12/2021 | Bakka et al. | |
| 2023/0009450 | A1* | 1/2023 | Reynolds ................ | H04W 8/18 |
| 2023/0164530 | A1* | 5/2023 | Tessler ................... | H04W 4/80 |
| | | | | 455/41.3 |
| 2024/0073666 | A1* | 2/2024 | Kim ...................... | H04W 4/023 |

OTHER PUBLICATIONS

Written Opinion mailed Oct. 5, 2021 for PCT Appl. No. PCT/GB2021/051694, 6 pages.

Mohsen Darianian et al.: RFID Master-Slave Reader Architectures for Smart Spaces Applications, IEEE Third International Conference on Pervasive Computing and Applications, Oct. 6, 2008, pp. 741-746, Abstract, Section 2. Wireless Master-Slave Reader Architecture.

Cong T. Nguyen et al: "Enabling and Emerging Technologies for Social Distancing: a Comprehensive Survey", Arxiv.org, Cornell University Library, May 2, 2020, abstract, Section G. RFID; 42 pages.

Tile web page; https://www.thetileapp.com/en-gb/how-it-works; Jun. 30, 2020; 6 pages.

\* cited by examiner

| UUID | Contact Time [s] | Mean Range [m] |
|---|---|---|
| 1234567 | 5 | 2.04 |
| 2458978 | 2 | 2.35 |

FIG. 6

| UUID | Time | Range [m] |
|---|---|---|
| 1234567 | 11:01:05 | 3.0 |
| 1234567 | 11:01:06 | 2.2 |
| 1234567 | 11:01:07 | 1.6 |
| 1234567 | 11:01:08 | 0.8 |
| 1234567 | 11:01:09 | 2.6 |
| 1234567 | 11:01:10 | N/A |
| 1234567 | 11:01:11 | N/A |
| 1234567 | 11:01:12 | N/A |
| 1234567 | 11:01:13 | 2.8 |
| 1234567 | 11:01:14 | 1.9 |
| 2458978 | 11:01:15 | N/A |
| 2458978 | 11:01:16 | N/A |
| 2458978 | 11:01:17 | N/A |
| 2458978 | 11:01:18 | N/A |
| None | 11:01:19 | N/A |
| None | | N/A |

FIG. 5

DETERMINING PROXIMITY

BACKGROUND OF THE INVENTION

This invention relates to apparatus and methods for determining proximity.

It is known to use smartphones to monitor proximity. In the particular, it is known to use short-range Bluetooth™ radio signals to record interactions between users' smartphones, and to save a record of the users' contact history based on these interactions. This can be useful in epidemiology, to track the potential spread of infectious diseases, such as viruses spread by airborne droplet transmission. It may be enabled through the use of an application (app) running on the smartphone. The smartphone of a particular user of such an application may send proximity data to a remote server, identifying other phones with which the user's phone has been in Bluetooth™ contact. In the event that a user of the system is diagnosed with an infectious disease, these contact lists may then be used to determine other individuals who may be at risk of having contracted the infectious disease due to having been in proximity of the infected user. This can facilitate contact tracing, whereby at-risk individuals can be told to take preventative measures, such as quarantining or taking relevant medication or other relevant precautions. A central repository can also allow authorities to monitor the spread of the disease which can inform public health policy decisions.

Present approaches typically rely on the use of smartphones running an application to record and store Bluetooth™ interactions with other devices. In order to effectively record interactions, these smartphones are continually listening for Bluetooth™ signals, such that all possible interactions are recorded. This results in high power use, and can drastically shorten the battery life of the smartphone. Such approaches also require each user to carry a smartphone with a particular tracking app running. This may not always be desirable—e.g., in industries where hygiene or confidentiality are of high importance, or where the cost of smartphone ownership or provision makes this approach unaffordable.

The present disclosure seeks to provide an improved approach to recording proximity.

SUMMARY OF THE INVENTION

From a first aspect, the invention provides a method for determining proximity, the method comprising:

sending a wireless signal from a first mobile tag of a plurality of mobile tags, the wireless signal communicating identification information associated with the first mobile tag;

receiving the wireless signal at a second mobile tag of the plurality of mobile tags;

in response to receiving the wireless signal, storing proximity data comprising the identification information in a memory of the second mobile tag;

sending the proximity data from the second mobile tag to a mobile communication device using a first wireless protocol;

receiving the proximity data at the mobile communication device using the first wireless protocol;

storing the proximity data in a memory of the mobile communication device;

sending the proximity data from the mobile communication device to a server using a second wireless protocol, different from the first wireless protocol; and storing the proximity data in a memory of the server.

From a second aspect, the invention provides a system for determining proximity, the system comprising:

a plurality of mobile tags; and a mobile communication device, wherein each of the mobile tags is configured to:

send wireless signals communicating identification information associated with the mobile tag;

receive a wireless signal from another of the mobile tags, the wireless signal communicating identification information associated with the other mobile tag;

in response to receiving the wireless signal, store proximity data comprising the received identification information in a memory of the mobile tag; and send the proximity data to the mobile communication device using a first wireless protocol, and wherein the mobile communication device is configured to receive the proximity data using the first wireless protocol;

store the proximity data in a memory of the mobile communication device; and send the proximity data to a server using a second wireless protocol, different from the first wireless protocol.

In some embodiments, the system may comprise the server.

From another aspect, the invention provides a mobile tag for use in a system for determining proximity, the mobile tag being configured to:

send wireless signals communicating identification information associated with the mobile tag;

receive a wireless signal from a second mobile tag, the wireless signal communicating identification information associated with the second mobile tag;

in response to receiving the wireless signal, store proximity data comprising the received identification information in a memory of the mobile tag; and send the proximity data to the mobile communication device using a first wireless protocol.

From another aspect, the invention provides a mobile communication device for use in a system for determining proximity, the mobile communication device being configured to:

receive proximity data from a mobile tag using a first wireless protocol;

store the proximity data in a memory of the mobile communication device; and send the proximity data to a server using a second wireless protocol, different from the first wireless protocol.

Thus it will be seen that, in accordance with the invention, proximity data is recorded on a server by means of mobile tags that communicate with the server via an intermediary mobile communication device, such as a smartphone, rather than having to communicate directly with the server. This allows proximity tracking to be performed in a centralised manner, using mobile tags that may be simpler and cheaper than smartphones. In particular, the mobile tags may, in some embodiments, support a short-range wireless protocol, such as Bluetooth Low Energy (BLE)™, without having any mechanism for communicating directly over a wide area network (WAN) or over the Internet. They may have no long-range wireless interface and/or no wired network interface. In some embodiments, the tags are not able to send or receive Internet Protocol (IP) packets. As well as reducing deployment costs, the use of such mobile tags may mitigate security concerns that the use of smartphones could present in some environments.

Using mobile communication devices, such as smartphones, to route data between the mobile tags and the networked server, also advantageously avoids the need to install fixed gateway infrastructure, as might otherwise be required for collecting data from mobile tags. This can keep costs low by making deployment and maintenance simpler and faster.

In some embodiments, a first mobile tag may be carried by a first human user and a second mobile tag may be carried by a second human user. This carrying may be secure carrying (e.g. using a fastener) or loose carrying (e.g. using a handle or cord). Each tag may comprise a carrying mechanism, such as a handle, cord or lanyard, or may comprise a fastener or fastening means, such as a strap, buckle, pin, clasp, stitching or adhesive, for fastening the tag directly to the user or to an article or item worn or carried by the user (e.g. to clothing, personal equipment or identification badge). In this way, the system enables human-to-human proximity to be recorded. However, this is not essential, and some embodiments may be used to record proximity between any mobile items, such as humans, animals, vehicles and/or goods.

In some embodiments, the proximity data on the server may be used for identifying a set of mobile tags that have been in proximity with a particular mobile tag during a time window (e.g. within the last week). This may allow a set of human users to be identified who have an increased likelihood of being infected with a disease due to having been in proximity with a human user who is determined to have the disease. The server may be configured to provide an interface for accessing or querying the proximity data stored in the memory. It may be configured to process or display the proximity data—e.g. comprising a display for displaying the proximity data, or data derived from the proximity data.

Some embodiments may comprise determining that a user of a first mobile tag is a user of interest (e.g. has been diagnosed with a transmissible disease). They may comprise determining identification information associated with the first mobile tag. They may comprise identifying proximity data in the memory of the server that comprises said identification information. They may comprise determining, from the proximity data, the identification information associated with one or more mobile tags that have received said wireless signals from the first tag. They may comprise identifying one or more users of the determined tags. A notification may be sent to each identified user—e.g. warning the user of an increased risk of being infected. The sending may be performed electronically by the server, or may be carried out manually or by other means.

Each mobile tag may be a battery-powered device. It may comprise a transceiver for sending and receiving the wireless signals—e.g. a radio transceiver. It may comprise a display screen or other user interface, although this is not essential, and in some embodiments at least one of the mobile tags has no electronic display screen. It may support only the first wireless protocol (i.e. it may, some embodiments, support no other wireless communication protocol apart from the first wireless protocol). By such means, the tags may, in some embodiments, advantageously be produced at lower cost than the mobile communication devices.

The wireless signals communicating identification information may be radio signals, optical signals or acoustic signals. In a preferred set of embodiments, they are radio signals. They may be sent using the first wireless protocol—i.e. the same protocol that the tags use to communication with the mobile communications device.

The first wireless protocol may be a radio protocol. It may be a short-range radio protocol. It may be a Bluetooth™ protocol; preferably Bluetooth Low Energy (BLE)™. The wireless signals may be BLE advertising messages.

The identification information may be unique to each mobile tag within the system. It may be a binary identifier which may be modulated on the wireless signal. It may comprise a 128-bit Bluetooth™ unique user identifier (UUID). The UUID of each mobile tag within the system may be constant, or may be updated over time. Each tag may be configured to change its UUID at intervals, which may be based on a preinstalled value (e.g. a seed or key) or based on a value received by the tag from the server (e.g. via the mobile communication device). This can enhance the privacy of the system.

The server may store data associating the identification information with respective users of the system. In some embodiments, the mobile communication device is configured for associating a mobile tag with a user. This may be done by selecting a user name on touchscreen interface of the mobile communication device, within a time window of the mobile tag sending a registration message to the mobile communication device using the first radio protocol—e.g. in response to a user pressing a button on the mobile tag. The mobile communication device may communicate the association to the server for storage on the server.

Each mobile tag may be configured to send a succession of wireless signals over time. These may be sent in a regular pattern, e.g. at regular intervals (e.g. one every five seconds) or in bursts at regular intervals.

In some embodiments, the mobile tags may comprise synchronised clocks. They may be configured to transmit respective wireless signals in a common transmission window. They may be configured not to transmit the wireless signals outside the common transmission window. They may be configured to listen for wireless signals from other mobile tags in the common transmission window. This can allow the tags to save power by powering down transceiver circuitry (e.g. a radio module) outside the common transmission window. The clocks may be synchronised by the mobile communication device.

The mobile communication device may be a smartphone or tablet computer. It may comprise a display screen (e.g. a touchscreen display). It may comprise a cellular-network radio. The system may comprise a plurality of such mobile communication devices. Each mobile communications device may be carried by a respective human user (e.g. in a pocket or bag or held in a user's hand).

Each mobile communication device may be configured to send a wireless signal communicating identification information associated with the mobile communication device. Each mobile communication device may be configured to receive a wireless signal from a mobile tag or other mobile communication device, the wireless signal communicating identification information associated with the mobile tag or other mobile communication device. It may be configured, in response to receiving the wireless signal, to store proximity data comprising the received identification information in a memory of the mobile communication device. It may be configured to send the proximity data to the server using the second wireless protocol—e.g. in the same communication as proximity data received from one or more mobile tags.

The second wireless protocol may be a WiFi (IEEE 802.11) protocol, or it may be a cellular communication protocol such as a 3G, 4G or 5G protocol. The server may receive the proximity data over a wired connection such as an Ethernet connection. The proximity data may be sent to the server over a wide area network (WAN) and/or over the Internet.

The second mobile tag may send proximity data directly to the mobile communication device using the first wireless protocol, or the proximity data could be sent from the second mobile tag to the first mobile tag, then from the first mobile tag to the mobile communication device.

The mobile tags may store proximity data in response to receiving wireless signals from a plurality of mobile devices and may send all of the stored proximity data together to the mobile communication device—e.g. in response to determining that the mobile communication device is in communication range.

Each mobile tag (and optionally each mobile communication device) may be configured to determine a received signal strength indicator (RSSI) value for a wireless signal received from another mobile tag (or from another mobile communication device). The proximity data may comprise this RSSI value, or a value derived therefrom. The mobile tag may be configured to calculate a range value from one or more RSSI values for wireless signals received from the other tag. It may be configured to average a plurality of RSSI values when generating a range value for another mobile tag. This may help to reduce the impact of outlier RSSI values. It may reduce memory requirements for the mobile tags (potentially lower manufacturing costs), compared with storing an RSSI value for every received wireless signal. The mobile tag may calculate an inverse square or inverse cube of each RSSI value when calculating a range value. It may calculate a range value as a harmonic mean of a plurality of values derived from a plurality of RSSI values. This may help give reduce the effect of angle-dependent variation by giving more weight to shorter range values, which may give a more reliable indication of distance. The proximity data may comprise or be derived from one or more range values.

In some embodiments, each mobile tag is configured to calculate an exposure value for another of the mobile tags, based on a plurality of wireless signals received from the other mobile tag. It may calculate one exposure value from all the wireless signals received from a particular tag over a time window, which may represent all the time that the two tags are in wireless range of each other during an interaction (sometimes referred to herein as an interaction event). The mobile tag may be configured start the time window upon detecting the other tag, and close the time window after a predetermined time (e.g. a timeout period) of receiving no further wireless signals from that tag or of receiving no further wireless signals that are above a threshold RSSI value (e.g. after thirty seconds, or ten minutes or two hours of no signals). The interaction time window may therefore be just thirty seconds long, or could be several minutes or hours long, e.g. if two users sit down next to each other in a meeting or for lunch.

The exposure value may be calculated from a plurality of range values determined from the wireless signals received from the other tag over the time window. It may be determined by integrating a function of the plurality of range values over time. The function may decrease monotonically with increasing range. It may comprise of a Gaussian curve centred (i.e. attaining its maximum) at zero range. This is believed to provide a useful way of efficiently representing the risk of transmitting an airborne disease between users of the system. The proximity data may comprise such an exposure value. This can allow the proximity data stored on the mobile tags to be very compact—e.g. representing range and time information for a proximity event between two mobile tags, which may have lasted several seconds, minutes or hours, as a single value. This enables the mobile tags to log a lot of tag interactions in a small memory space, and to transmit the logged data efficient to the mobile communications device when it is in range.

The proximity data may further comprise a time of arrival of a wireless signal from another tag.

The proximity data may further comprise identification information associated with the mobile device that received a wireless signal or signals from another mobile device (e.g. of the second mobile tag, in addition to the identification information associated with the first mobile tag). This identification information may be stored separately from the rest of the proximity data when the proximity data is stored in the memory of the second mobile tag—e.g. being a UUID stored in a ROM of the second tag—but may be stored with the rest of the proximity data (e.g. as a data field in a common data structure) when the proximity data is stored in the mobile communication device and in the server.

The mobile communication device may comprise memory storing application software for execution by a processor of the mobile communication device. The application software (or app) may, when executed, cause the device to carry out one or more of the operations disclosed herein. The application may be configured to execute in the background—i.e. without displaying output on a display screen of the device. It may control one or more radios of the device.

Each mobile tag may comprise a processor and may store software in a memory for execution by the processor to cause the mobile tag to perform some or all of the operations disclosed herein. The software stored on a mobile tag may be updated using data received by the tag from the mobile communication device (e.g. a firmware update).

In some embodiments, at least some of the proximity data may comprise location information.

Some embodiments of the system may comprise one or more static beacons. The static beacons may be configured to send wireless signals to, and optionally receive wireless signals from, mobile tags of the plurality of mobile tags and/or the mobile communication device or devices. The wireless signals may be radio signals, optical signals or acoustic signals. In a preferred set of embodiments, they are radio signals. They may be sent using the first wireless protocol—i.e. the same protocol that the mobile tags use to communication with the mobile communications device.

Static beacons may interact with the system similarly to mobile tags (although from a fixed location). Each static beacon may be configured to send wireless signals communicating identification information associated with the respective static beacon. Said wireless signals may be received at mobile tags and mobile communication devices in a manner equivalent to the wireless signals sent from the mobile tags. Proximity data comprising identification information of the static beacon may be stored in the memory of a mobile tag in response to receiving a wireless signal from a static beacon. The identification information of the static beacon may be communicated to the server via a mobile communication device. The server may be configured to receive the proximity data from the mobile communication device and to process the proximity data to determine a location of the static beacon—this may comprise determining a location by using the identification information as a key into a database stored in the server, or it may comprise decoding location information that is explicitly encoded in the proximity data.

One or more of the static beacons may be configured to receive wireless signals, communicating identification information associated with mobile tags of the system, and to store proximity data comprising the identification information in a memory of the static beacon. Said proximity data may be sent from the static beacon to a mobile communication device using the first wireless protocol—e.g. when a mobile communication devices within communication range of the static beacon.

A static beacon may have any one or more of the features disclosed herein with respect to mobile tags (except for mobility). For example, each static beacon may be a battery-powered device, and may comprise a transceiver for sending and receiving the wireless signals—e.g. a radio transceiver. Each static beacon may thus comprise any feature described herein in relation to the mobile tags of the system.

Some embodiments of the system may comprise one or more static gateways. Each static gateway may be configured to receive wireless signals from mobile tags and/or from mobile communication devices. In particular, each static gateway may be configured to receive proximity data from a mobile tag using the first wireless protocol Each static gateway may be configured to store the proximity data in a memory of the static gateway. It may be configured to send the proximity data to the server using the second wireless protocol.

Static gateways may interact with the system similarly to the mobile communication devices (although from a fixed location). A static gateway may have any one or more of the features disclosed herein with respect to mobile communication devices (except for mobility). For example, each static gateway may comprise a cellular radio and/or may comprise a tablet computer.

One or more of the static gateways may also be a static beacon, although this is not essential.

A static beacon or gateway may be in contact with or fastened to an immovable object or structure, such as a wall or floor or ceiling of a building. Each static beacon and/or gateway may have a respective location that is fixed within an environment (e.g. fixed relative to Earth, or fixed relative to the hull of a ship). The location may be known to the system—e.g. may be represented by data in a database in a memory of the server. A location of a beacon or gateway may be associated with identification information of the beacon or gateway in a memory of the server.

A static beacon may be configured to communicate information representative of its location to mobile tags and/or mobile communication devices using wireless signals—e.g. to tags or devices in proximity of the beacon. Proximity data stored by a mobile tag in response to a wireless signal received from a static beacon may include location information.

In some embodiments, a static gateway may be configured to process proximity data, comprising received identification information, received by the static gateway, to include location information to the proximity data. The processed proximity data including location information may be sent to the server by the static gateway using the second wireless protocol.

The location information may comprise identification information associated with the static beacon or gateway (e.g. a unique ID). The server may comprise data that associates such identification information with a respective geographical location. However, in other embodiments, the location information may itself comprise geographical information. It may identify a location within an environment or building (such as a name or identifier of a room or a floor of a building), or it may comprise geographic coordinates of a location. For example, the location information may comprise latitude and longitude values representative of the location of a static beacon or gateway.

Proximity data including location information may be transmitted to the server, via a mobile tag or mobile communication device, without the location information being used by the mobile tag or mobile communication device. However in some embodiments, the mobile tags and/or mobile communication devices may be configured to process received location information within the tag or device (e.g. to signal an alert to a user if an interaction is detection proximate to a predetermined location).

The use of location information by the system may allow proximity events to be assigned to a particular locality. Wireless signals transmitted by static beacons or gateways may be used to a estimate a location of a mobile tag or mobile communication device based on proximity between the mobile tag or mobile communication device and one or more of the static beacons or gateways. For example, a static beacon or gateway may be located in a particular room of a building, and may be used to determine that a first mobile tag carried by a user has been in proximity of said room of the building in the event that the first mobile tag receives a wireless signal from the static beacon or gateway.

Thus in some embodiments, proximity data may be used for identifying a set of mobile tags that have been in proximity with a particular static beacon or gateway during a time window (e.g. within a two-hour period). This may allow a set of human users to be identified who have been in proximity with the location of said static beacon or gateway during said time period. This may be used, for example, to determine a set of human users who have an increased likelihood of being infected with a disease due to having been in proximity with a location visited by a human user who is determined to have the disease a short time after the infected user has been in proximity of the location.

In some embodiments, the server may be configured to identify a set of mobile tags and/or communication devices that have been in proximity with a particular static beacon or static gateway during a time window. This information may be used, for example, to determine a level of occupancy of a region proximate to the static beacon or gateway. This may allow areas having particularly high occupancy to be identified, which may be useful for modelling the movement of users within an environment such as a building or vehicle.

Any of the steps described herein as being performed by the mobile tags may also be implemented on the mobile communication device(s). Any of the steps described herein as being performed by a mobile tag may be implemented by a static beacon. Any of the steps described herein as being performed by a mobile communication device may be implemented by a static gateway.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain embodiments of the invention will now be described with reference to the accompanying drawings, in which:

FIG. 5 is a data structure in which interactions between the Bluetooth tags are initially recorded and stored in the Bluetooth tags;

FIG. 6 is a data structure in which recorded interactions between the Bluetooth tags are further processed and stored in Bluetooth tags.

DETAILED DESCRIPTION

Figure 1:
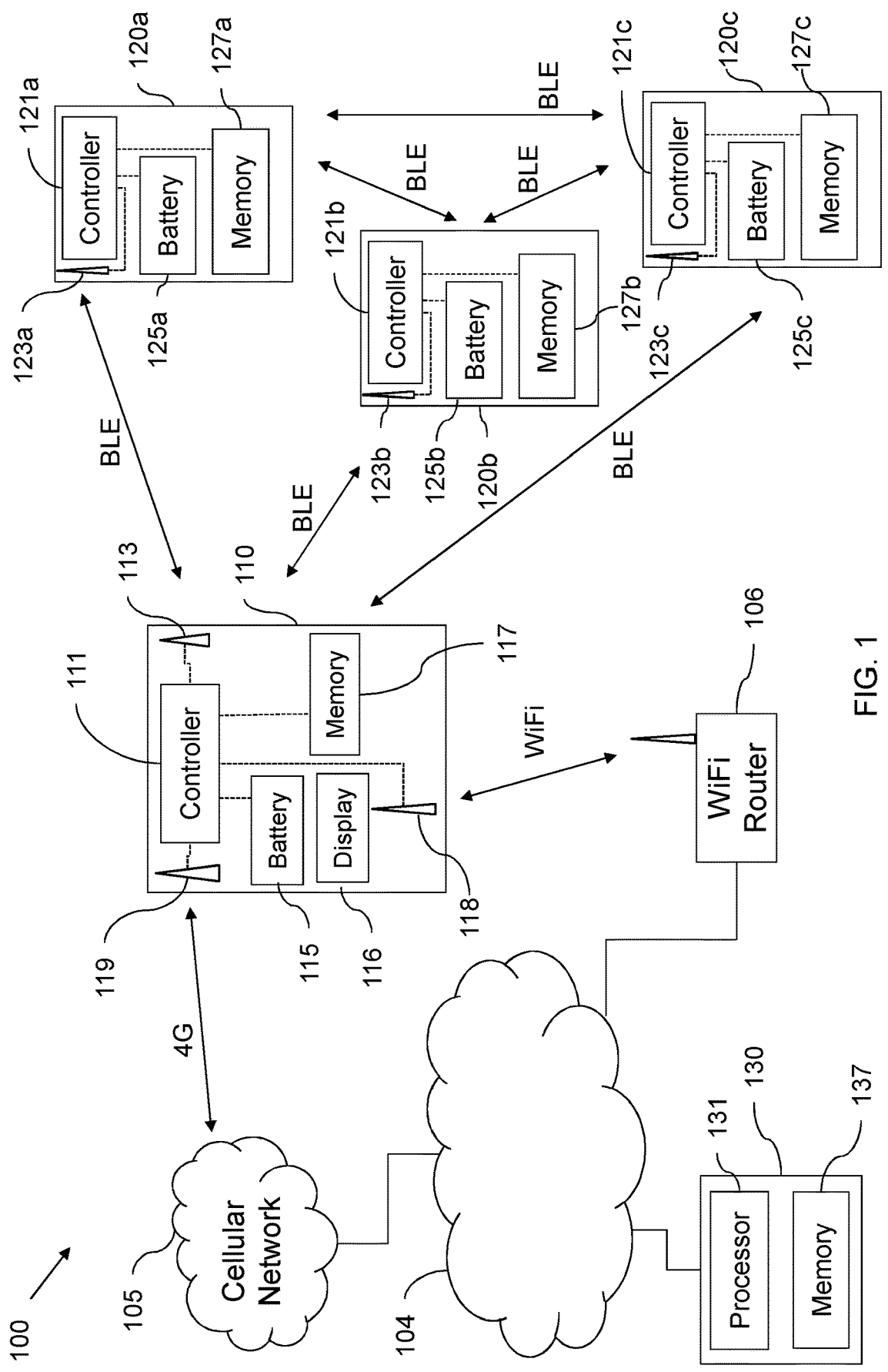
FIG. 1 is a schematic illustration of a contact tracing system embodying the invention.

FIG. 1 shows elements of a contact tracing system 100 that can be used to determine whether particular users of the contact tracing system 100 have been in proximity of one another. For example, contact tracing system 100 may be used by an organisation to determine which employees at a workplace such as a factory or food preparation site have been in close proximity. In the event that a particular employee is later diagnosed with an infectious disease that is spread by airborne transmission (such as through coughing or sneezing), the contact tracing system 100 can be used to identify those who are at increased risk of having caught the disease due to proximity to the infected employee. Once any at-risk individuals have been identified, they may be tested, treated, quarantined or asked to isolate for a period of time in order to prevent the spread of the disease.

The exemplary contact tracing system 100 shown in FIG. 1 comprises a mobile device 110 that supports multiple radio protocols, such as a smartphone, three exemplary mobile Bluetooth™ tags 120a, 120b, 120c, and a networked server 130. The multi-radio device 110 can communicate with the networked server 130 over a network 104 (which could comprise a local area network (LAN) and/or a wide area network (WAN) and/or the Internet) using a WiFi™ router 106 and/or a cellular network 105 (e.g. via a 4G or 5G base station). However it will be appreciated that the contact tracing system 100 may comprise additional multi-radio devices 110 (which may include mobile and/or static devices), and Bluetooth tags 120 as appropriate for the particular circumstances in which the contact tracing system 100 is used. In some embodiments, each human worker within a site, building or workplace may be provided with a tag 120, which could involve hundreds or even thousands of tags 120.

The multi-radio mobile device 110 has a controller 111 (e.g. comprising a smartphone processor and one or more radio modules), a battery 115 for supplying power to the mobile device 110, and a memory 117 for storing data and/or software for the controller 111. It has a touchscreen display 116 for user interaction.

The multi-radio mobile device 110 also contains a first antenna 113, for transmitting and receiving Bluetooth Low Energy™ (BLE) radio signals between the mobile device 110 and the Bluetooth tags 120, a second antenna 118, for transmitting and receiving radio signals using WiFi™, and a third antenna 119 for exchanging data over a cellular data link such as an LTE 4G channel to the cellular network 105. The first and/or second antennae 118, 119 are used to transmit signals from the mobile device 110, over the network 104, to the networked server 130.

The multi-radio device 110 may have further standard electronic components such as further radio transceivers, wired-network interfaces, buttons, etc. In some embodiments, the multi-radio device 110 is a tablet or mobile telephone (cell phone) such as an Apple™ or Android™ smartphone, which may be moved around an environment by a user.

In a variant set of embodiments, the multi-radio device 110 need not be a mobile device, but may be a static gateway having a fixed location. It may then lack the display 116, and may optionally be mains powered instead of battery powered. Embodiments of the system 100 may include a mix of such mobile communication devices and static gateway. The features of the multi-radio device 110 described herein may also be features of such static gateways.

The multi-radio device 110 may run software (e.g. a dedicated proximity recording app), in the foreground or background, that causes the device 110 to transmit BLE signals (e.g. advertising messages) at intervals and to listen for incoming BLE signals (e.g. advertising messages from the Bluetooth tags 120 and from other multi-radio mobile devices 110).

Each of the Bluetooth tags 120 has a controller 121 (e.g. a microcontroller or an application-specific integrated circuit, as well as Bluetooth™ RF front-end and baseband circuitry) for causing the Bluetooth tag 120 to transmit and receive BLE signals, a battery 125 for supplying power to the Bluetooth tag 120, and a memory 127 for storing data (and/or software instructions for the microcontroller). The Bluetooth tag 120 also contains an antenna 113 for transmitting and receiving Bluetooth Low Energy™ (BLE) radio signals. The Bluetooth tags 120 may have further standard electronic components such as further radio transceivers, display screens, buttons, etc. Each Bluetooth tag 120 may be a wearable device, such as a wristband, badge or lanyard, or may take the form of a sticker to be fastened to an existing ID badge.

The networked server 130 contains a processor 131 and a memory 137 for storing data and software. It may be static and externally-powered. It also comprises a network connection to the network 104. The networked server 130 may be a single physical device, or may be a distributed (e.g. cloud) server system. It may be in the same building, or on the same site, as the multi-radio mobile device 110 or it may be remote from the mobile device 110, e.g. in a remote data centre accessed over the internet.

The controllers and processors 111, 121, 131 may include one or more processors, DSPs, ASICs and/or FPGAs. They may include memory for storing data and/or for storing software instructions to be executed by a processor or DSP. They may include any other appropriate analogue or digital components, including amplifiers, oscillators, filters, ADCs, DACs, RAM, flash memory, radio front-end modules, radio-frequency transceivers, baseband modules, etc.

In the contact tracing system 100 as described herein, multi-radio mobile devices 110 and Bluetooth tags 120 are carried by users of the system (e.g. pinned to clothing). In some environments, such as secure workplaces which deal with confidential information, it may not be permitted for workers to carry personal camera-equipped or Internet-connected devices such as smartphones 110.

Similarly in food processing environments it may be inappropriate to carry a smartphone for hygiene reasons. In some situations, workers may not own smartphones or may not consent to their use by their employer, and it may be expensive to provide workers with sophisticated mobile communication devices. In such environments, at least some users of the contact tracing system 100 may carry a Bluetooth tag 120 instead of a smartphone 110. In some environments, users of the system may carry a mix of Bluetooth tags 120 and smartphones 110 as appropriate. For example, each junior employee at a particular company using the contact tracing system 100 may carry a Bluetooth tag 120, while a smaller subset of workers, e.g. supervisors, may alternatively or additionally carry smartphones 110.

Although FIG. 1 has been described as showing three Bluetooth tags 120, in some embodiments, one or more of these (e.g. the device 120a) could instead be a static Bluetooth beacon having a fixed location. For example, a static Bluetooth beacon may be mounted to a wall or ceiling of one or more rooms of a building or vehicle. The features of the Bluetooth tags described herein may also be features of such static beacons, although, in some embodiments, a static Bluetooth beacon may lack Bluetooth radio reception capabilities and may support only Bluetooth radio transmission.

In use, each of the Bluetooth tags 120 associated with the contact tracing system 100 is configured to listen for Bluetooth Low Energy™ (BLE) radio signals from other Bluetooth tags 120 and from the mobile devices 110 of the contact tracing system 100, and is also configured to send BLE advertising messages at regular or irregular intervals, using its antenna 123. (However, in some embodiments in which one of the devices 120 is a static Bluetooth beacon, it the beacon may be a unidirectional beacon, i.e. configured to send BLE advertising messages, but not to receive BLE messages from other Bluetooth tags 120.) Each advertising message comprises a 128-bit unique user identifier (UUID) that is specific to the Bluetooth tag 120, and hence specific to the human carrier of the tag 120, so long as the allocation of tags 120 to users remains fixed. For example, each UUID may be paired with an employee ID used by the company. In embodiments in which one or more of the Bluetooth tags 120 is a static Bluetooth beacon, having a fixed location, the UUID of the static Bluetooth beacon may instead be specific to the location, e.g. associated with a room or area in which the beacon 120 is located.

If the mobile device 110 is carried by a specific user, it may also be configured to listen for BLE radio signals from the Bluetooth tags 120 and other multi-radio devices (e.g. other smartphones), and to send advertising messages over BLE at regular or irregular intervals using antenna 113, so as to act as another user-specific proximity-sensing device within the system 100.

Similarly, a static gateway 110 may be configured to send advertising messages over BLE at regular or irregular intervals, for mobile tags 120 in proximity of the gateway 110 to receive and generate proximity data from. In such cases, the proximity data can additionally comprise location information; this may be implicit in the UUID of the gateway 110 (e.g. being associated with a location in the memory 137 of the server 130) or it may be explicit (e.g. as additional data encoding geographic location information, such as an identifier of a room or area in which the gateway is located, or 2D or 3D coordinates of the location of the gateway).

When a first Bluetooth tag of the contact tracing system, e.g. Bluetooth tag 120a, receives one or more BLE advertising messages from a second Bluetooth tag, e.g. Bluetooth tag 120b, using its antenna 123a, the controller 121a of the first Bluetooth tag 120a determines range data for the two Bluetooth tags based on one or more received signal strength indicators (RSSI). The range data may simply be an RSSI value or a function of the RSSI value (e.g. inverse square or inverse cube), or it may comprise data derived from one or more RSSI values, e.g. as described below. If the location of one of the first and second Bluetooth devices 120a, 120b is known (e.g. in the case that one of the first and second Bluetooth device 120a, 120b is a static Bluetooth beacon with fixed location, instead of being a mobile tag), the first Bluetooth device 120a may also determine location data for the first and second Bluetooth device 120a, 120b. The location data may be the UUID of one or both of the Bluetooth beacons 120, which may be associated with a location in the memory 137 of the server 130, or it may comprise explicit additional information such as an identifier of a room or area in which the beacon is located, or 2D or 3D coordinates of the location of the beacon. The first Bluetooth tag 120a then stores the UUID of the second Bluetooth tag 120b, as well as a time at which the interaction was recorded, the range data, and optional additional location data if applicable, in its memory 127a. This proximity information is stored each time a new advertising message is received from the second Bluetooth tag 120b while the two Bluetooth tags 120a, 120b are within BLE range. Similar proximity data is independently recorded in the memory 127b of the second Bluetooth tag 120b in respect of further advertising messages received by the second tag 120b from the first tag 120a.

This process is performed for every advertising message received by each beacon or tag 120 (from a beacon or tag 120, or from a gateway or mobile multi-radio device 110 acting as a tag), and received by each smartphone or other multi-radio device 110 in the system 100 (from a beacon or tag 120). In this way, a database of the interaction history between Bluetooth devices 110, 120 of the contact tracing system 100 can be built up and stored in the memory 127 of each of the Bluetooth beacons or tags 120 and in the memory 117 of the gateways or mobile devices 110.

When one of the Bluetooth tags 120 comes into BLE contact range of a multi-radio mobile device 110 associated with the contact tracing system 100, the Bluetooth tag 120 transmits the proximity data (some of which may optionally include location information) determining from its interaction history over Bluetooth using antenna 123 to the multi-radio device 110, where it is temporarily stored in the memory 117 of the mobile device 110. After transmitting the interaction history data to the mobile device 110, the Bluetooth tag 120 may delete the data from its own memory 127. This allows the memory 127 to be reused, and means that the memory 127 can be kept relatively small, helping to keep the cost of each tag 120 low.

Once all of the proximity data associated with the full interaction history of the tag 120 has been received by the mobile device 110 and temporarily stored in the memory 117, the mobile device 110 transmits this data to the networked server 130. It may do this immediately, or at intervals—e.g. potentially sending a batch of proximity data accumulated over time from multiple tags 120 as well as proximity data generated directly by the mobile device 110 itself. The WiFi antenna 118 or 4G antenna 118 is used to transmit this data using radio signals over a WiFi or a cellular data link when an appropriate network connection is available. The proximity data may be sent from the mobile device 110 in one or more IP packets addressed to the server 130. The data may be formatted differently for this onward transmission by the mobile device 110—e.g. being compressed or encoded in any appropriate way. Although the data initially leaves the mobile device 110 in a radio signal, it will be appreciated that it may travel over one or more wired connections, such as copper cable and/or fibre-optic cables, before reaching the server 130.

This process may be implemented in software using an application (app) deployed on the mobile device 110 and executed by the controller 111. In some embodiments, the mobile device 110 may transmit the interaction data stored in its memory 117 to the networked server 130 at regular intervals, while in other embodiments it may transmit data to the networked server 130 in response to receiving new data from a Bluetooth tag 120 of the contact tracing system 100 or in response to receiving BLE advertising messages from other multi-radio devices or tags 120.

The interaction history (i.e. proximity) data associated with the tag 120 and/or the mobile device 110 is stored by the networked server 130 in a centralised database in a memory 137 of the server 130. After sending the interaction history data to the networked server 130, the mobile communication device 110 may delete the data from its memory 117. This may facilitate user privacy, as well as freeing up the memory 117. In some embodiments, interaction data may be deleted by the mobile communication device 110 only after an acknowledgement is received from the server 130 by the mobile communication device 110. Similarly, interaction data may be deleted by the Bluetooth tag 120 only after an acknowledgement is received from the server 130 the Bluetooth tag 120. Such an acknowledgement may be sent from the server 130 to the mobile communication device 110 over a WiFi or a cellular data link, and a corresponding set of one or more acknowledgements may be sent by the mobile communication device 110 to each Bluetooth tag 120 whose UUID was contained in the interaction data, over Bluetooth, when the relevant tag 120 is next in radio range of the mobile communication device 110.

Figure 2:
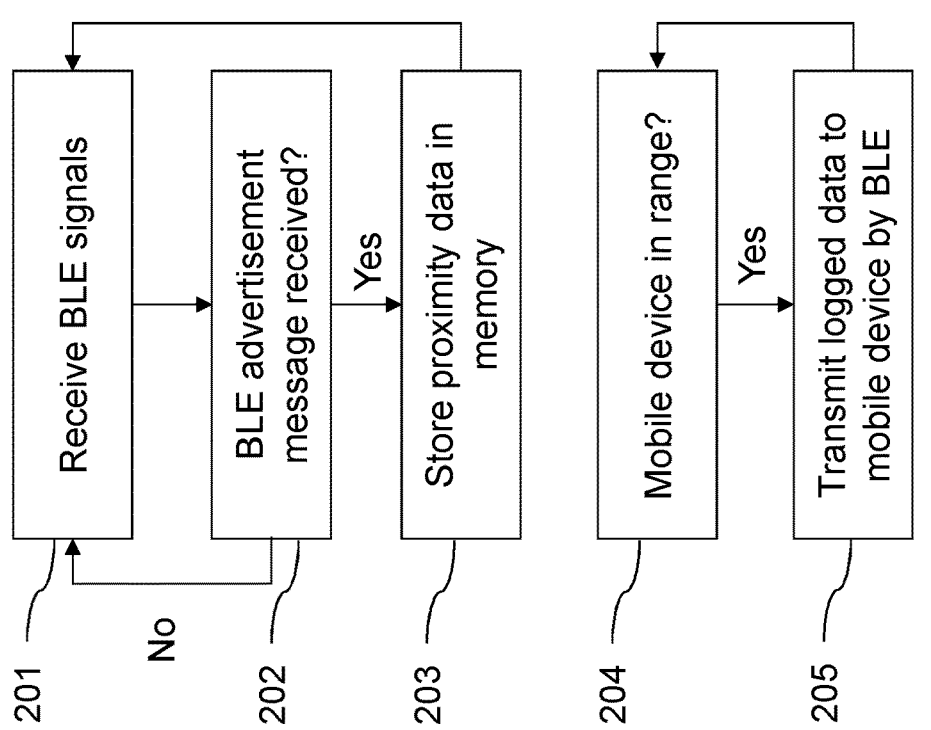
FIG. 2 is a flow chart describing steps carried out by the Bluetooth™ tags of the contact tracing system.

FIG. 2 provides an outline of the steps performed by each tag 120.

The tag 120 activates its radio receiver to receive 201 BLE signals. It may do this continuously or only intermittently (e.g. as described below). It checks 202 for incoming BLE advertisement messages. When such a message is received from another tag 120 (or from a multi-radio mobile device 110, in embodiments in which tags also log advertising messages from the mobile devices 110), it generates and stores 203 proximity interaction data in its memory 127. If it detects 204 a multi-radio mobile device 110, the tag 120 also sends all of its logged proximity data to the mobile device 110. It then clears its memory 127.

Figure 3:
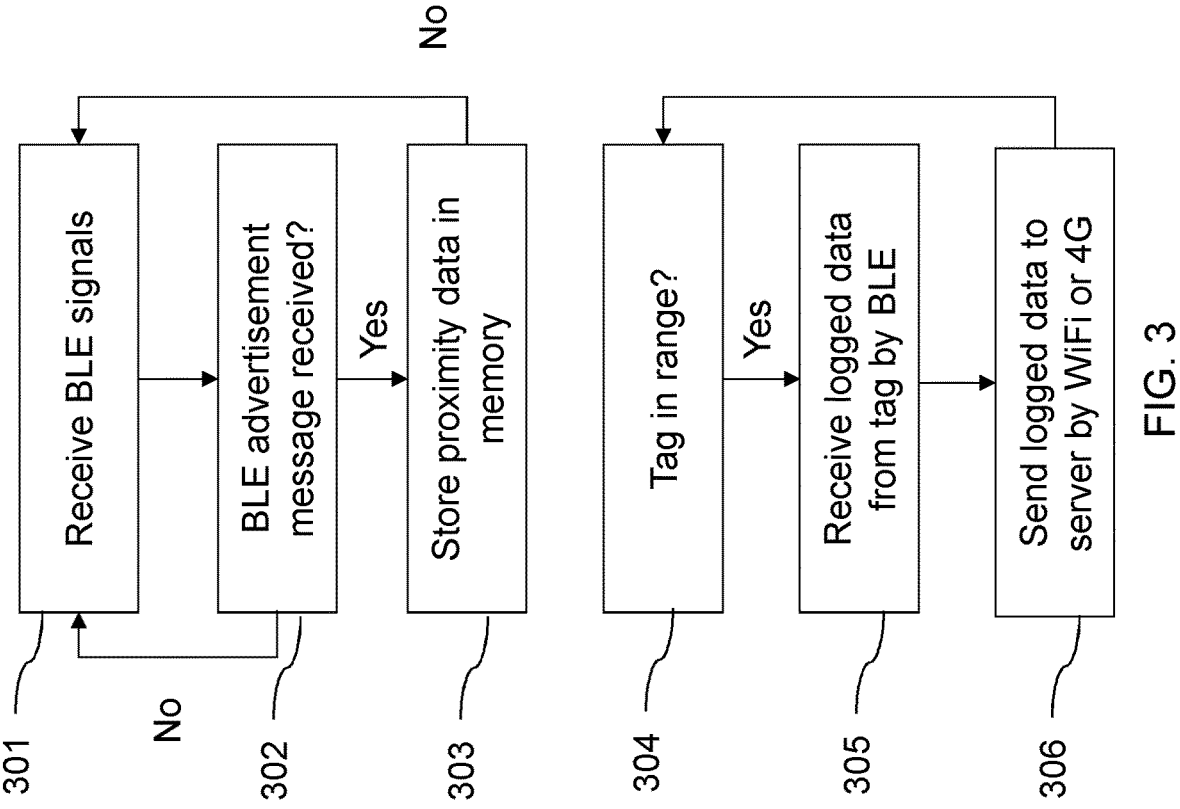
FIG. 3 is a flow chart describing steps carried out by the multi-radio mobile devices of the contact tracing system.

FIG. 3 provides an outline of the steps performed by each multi-radio mobile device 110.

The multi-radio mobile device 110 activates its radio receiver to receive 301 BLE signals. It may do this continuously or only intermittently (e.g. as described below). It checks 302 for incoming BLE advertisement messages. When such a message is received from a tag 120 or from another multi-radio mobile device 110, it generates and stores 303 proximity interaction data in its memory 117. If it detects 304 a tag 120, the mobile device 110 also receives 305 logged proximity data from the tag 120 over Bluetooth. Immediately or some time later the mobile device 110 sends 306 the logged proximity data from the tag 120 (potentially along with logged data received from other devices and/or generated by the mobile device 110 itself) to the server 306, initially over a WiFi or cellular link.

Figure 4:
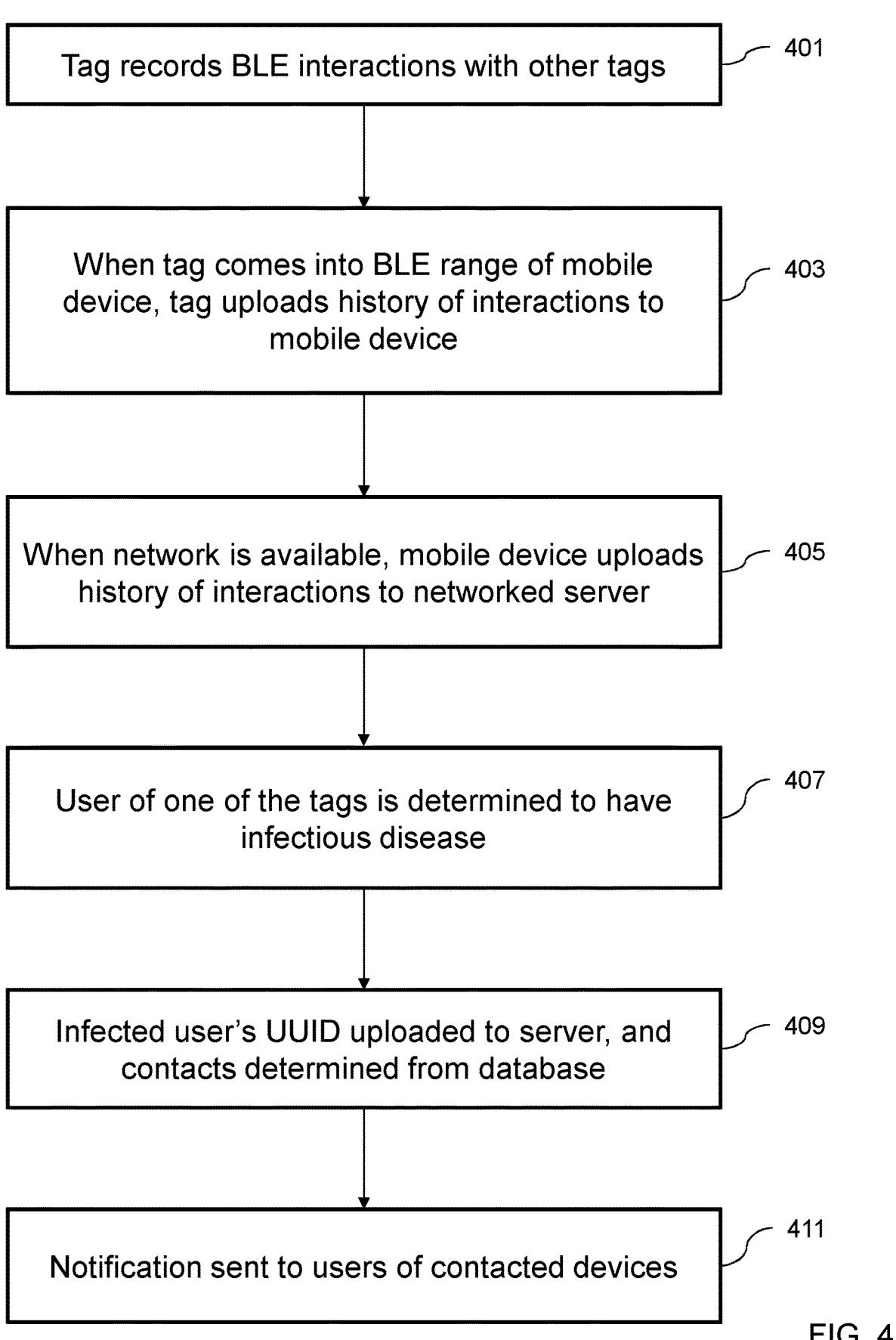
FIG. 4 is a flow chart describing the operation of the contact tracing system according to embodiments of the invention.

FIG. 4 is a flow chart showing a typical contact tracing process as carried out using contact tracing system 100.

In block 401, a first Bluetooth tag 120 records interactions with a plurality of tags 120 over a period of time, which may be several minutes, hours or days. These interactions are saved in the memory of the Bluetooth tag 120 as a series of identifiers of the other tags which the first Bluetooth tag has come into contact with along with timestamps. It may also generate and store an "interaction equivalent exposure" value as explained below.

In block 403, the first Bluetooth tag 120 comes into BLE range of a mobile device 110 associated with the contact tracing system 100. Once the Bluetooth tag 120 determines that it is within BLE range of the mobile device 110, the Bluetooth tag transmits the logged interaction history stored in its memory 127 to the mobile device, where it is temporarily stored in the memory 117 of the mobile device.

In block 405, the mobile device 110 determines that it is connected to a network (e.g. the Internet), using for example a WiFi or cellular data connection. Once this connection is established, the mobile device transmits the stored interaction history it received from the Bluetooth tag (and optionally the interaction history of the mobile device itself, in addition to the interaction history of any other Bluetooth tags that have come within BLE range of the mobile device prior to its connection to the network). The transmitted interaction histories are then stored in a centralised database in a memory 137 of the networked server 130.

No further action need be taken by the networked server 130, other than receiving and storing proximity data, until a human user who carries one of the Bluetooth tags 120 or mobile devices 110 is determined to have an infectious disease. At this point in time, the user may indicate to the contact tracing system (electronically or via a human operator) that they have received a positive diagnosis, and an "infected" flag may be added to the proximity data associated with the user in the database in block 407. The identifiers (e.g. UUIDs) of devices with which the user has come into contact are then determined and flagged as "at risk". This determination may be based on the range data associated with device interactions in the stored proximity data. It may, for example, identify those who have an "interaction equivalent exposure" value (as described below) with the infected user that is above some threshold. Optionally, further users who have been in proximity to the "at risk" users associated with these identifiers are also determined and flagged, and similarly for any chosen degree of association.

The users who have been flagged as "at risk" can then be contacted, for example through a notification sent to one or more their home address, email address, smartphone 110, tag 120 (if the tags are provided with a user interface, such as a screen or loudspeaker). These "at risk" users may then be asked to avoid the workplace, to seek medical advice, or to self-isolate, for a set period, in order to reduce the likelihood of the spreading the disease.

In this way, users of the contact tracing system 100 described herein may be notified as soon as an infected user is identified, and action may be taken to prevent the spread of disease. The system as described herein does not require any expensive new network equipment to be installed, but instead relies on ubiquitous mobile devices such as smartphones or tablets, e.g. running an application associated with the contact tracing system to communicate data from low-cost Bluetooth equipped tags to a networked server, allowing proximity events between users to be logged centrally.

Thus interaction history data can be obtained from the Bluetooth tags 120 of the contact tracing system 100, and can be transmitted to a centralised database without the Bluetooth tags 120 requiring a dedicated network connection, and without the installation of specialised static gateway infrastructure. Instead, any smartphone or tablet 110 associated with the contact tracing system 100 (e.g. running a particular app) can be used as a gateway to the networked server 130 as and when a Bluetooth tag 120 comes within BLE range of the mobile device 110. This approach removes the requirement for users of the contact tracing system 100 to carry a compatible smartphone in environments where such a solution is not feasible.

Over time, as more interaction data is stored in the centralised database in the memory 137 of the networked server 130, a detailed history of the interactions between users of the contact tracing system 100 can be built up, which may be used to determine which users of the contact tracing system 100 have been in proximity with one another over a certain time period. This information may be useful in the event that one user of the contact tracing system 100 is later diagnosed with an infectious disease, at which point those who have been in contact with the infected user may be determined, and subsequently informed, based on the interaction data stored in the centralised database in the memory 137 of the networked server 130 as will be described later in this application. The information may also be useful for analysing patterns of interactions between users, e.g. to devise effective risk mitigation strategies. It may, for example, identify groups of users who congregate dangerously, who can then be asked to change their behaviour to reduce the risk of transmission.

In some embodiments, in order to preserve the battery life of the Bluetooth tags 120, the tags 120 are synchronised so that they all transmit and listen for each other's BLE advertising messages in a common time window. The tags 120 can then all enter a lower power state during a common sleep period, during which their radio transceivers are inactive.

To enable this, each of the Bluetooth tags 120 may contain an on-board clock, e.g. running at 32 kHz. The on-board clocks of the Bluetooth tags 120 may be synchronised by any appropriate mechanism, for example by calibrating each on-board clock to an external reference clock during the initial set up of the Bluetooth tag 120 and at intervals during use—e.g. synchronising tags 120 to a clock of the mobile device 110 over Bluetooth, using a protocol based on NTP. A synchronisation accuracy of one millisecond or worse may still be sufficient to achieve significant power savings without compromising accuracy. The Bluetooth tags 120 may use their on-board clocks to transmit and receive BLE advertising messages at pre-set intervals. For example, in one set of embodiments, each tag 120 may send a series of multiple advertising messages over a 40 millisecond interval, repeating this every one second. In this way the Bluetooth tags 120 only have to listen for advertisement messages in a small time window (e.g. for a window of a 100 milliseconds every one second). In another set of embodiments, the transmission window may be more frequent than the listening window—e.g. each tag 120 may regularly send a single advertising message every 100 ms (i.e. ten messages every second). The same tag 120 may be configured to listen for incoming messages in every fiftieth or every hundredth of these 100 ms time windows (i.e. once every 5 or 10 seconds). In this way the Bluetooth tags 120 will receive at least one advertising message (occasionally two but typically just one) from any other Bluetooth tags 120 within range during the listening window, every 5 or 10 seconds, but the total amount of time with the radio receiver active can be substantially reduced.

As the listening window is substantially reduced compared with having the receiver active continuously, the amount of power consumed by the Bluetooth tags 120 is reduced, increasing the life of the battery 125 of the Bluetooth tags 120. In embodiments in which the Bluetooth tags contain synchronised clocks, the mobile device 110 may also have a clock synchronised to the clocks of the Bluetooth tags 120, such that the mobile device 110 only has to listen for advertisement messages in in a short time window. As the listening window is reduced for the mobile device 110, the amount of power consumed by the mobile device 110 is also reduced.

Storing time and range (e.g. RSSI-derived) data for each BLE advertising message received by a Bluetooth tag 120, in addition to a UUID, may require a significant amount of storage to be available in the memory 127 of each Bluetooth tag 120. In some embodiments, the total amount of information required to effectively record an interaction between two devices can be reduced in order to limit the amount of data required to be stored in the memory 127 of the Bluetooth tag 120, while still preserving information relevant for assessing proximity. Reducing the amount of data stored in the memory 127 associated with each interaction between Bluetooth tags 120 allows more interactions to be stored in the memory 127 of each Bluetooth tag 120, which have a limited storage capacity, and also allows for faster data transfer between the Bluetooth tags 120 and the mobile device 110.

When recording interactions between two Bluetooth tags, e.g. Bluetooth tags 120*a* and 120*b*, rather than logging a UUID, range data, time for each BLE advertising message and optionally location data, range data associated with a series of Bluetooth advertising messages of a particular tag-tag interaction may be accumulated over a time period and an aggregate range value determined. The time period may start when a particular tag is discovered (i.e. comes into range) and end at fixed time after ceasing to receive advertising messages from the tag (i.e. when the tag moves out of range)—e.g. after 30 seconds of receiving no advertising messages for that tag, or even up to 2 hours or more, depending on the expected usage scenarios.

An example of this is shown in FIGS. 5 and 6.

FIG. 5 shows a table of exemplary initial range data recorded during an interaction between a first Bluetooth tag 120, and two further Bluetooth tags 120: a second Bluetooth tag with UUID 1234567 and a third Bluetooth tag with UUID 2458978.

FIG. 6 shows a table of exemplary data recorded in the memory 127 of the first Bluetooth tag 120 after the interactions have been determined to have been completed. It will be appreciated that the exemplary data shown in FIGS. 5 and 6 is not exhaustive, and additional data (such as an explicit location of the interaction) may also be recorded in the memory of 127 of the first Bluetooth tag 120 if known.

In the interaction represented in FIG. 5, a user carrying the second Bluetooth tag with UUID 1234567 approaches the user of the first Bluetooth tag 120, which receives an initial advertising beacon at time 11:01:05. Using RSSI information, the first Bluetooth tag determines that the advertising tag is located at a distance of 3.0 m. (Although these values are here expressed in metres, for illustration, it will be understood that the range values may contain a large degree of uncertainty, since RSSI is not a very accurate way of measuring distance; also the values need not necessarily be stored in any recognised unit of distance.) A further advertising message is then sent from the second Bluetooth tag with UUID 1234567 at 11:01:06, at which time the first Bluetooth tag determines that the advertising tag is located at a distance of 2.2 m. This process continues, with the first Bluetooth tag temporarily storing the time, distance and UUID associated with each advertising message, until no BLE advertisement messages are detected by the first Bluetooth tag (shown in FIG. 5 as range measurement "N/A" at 11:01:10).

The first Bluetooth tag continues to listen for advertising messages from the second Bluetooth tag with UUID 1234567 until a predetermined timeout period (three seconds in the example shown in FIG. 5, although it could be several minutes or even hours) has elapsed, at which point the first Bluetooth tag determines that the interaction has completed. However, instead of keeping the timestamps, range and UUID associated with each advertising message sent by the second Bluetooth tag in the memory 127 of the first Bluetooth tag, in some embodiments proximity data for the interaction is generated by accumulating the data from the series of advertising messages from the second tag into a total contact time and an average range value, as shown in FIG. 6. In this way, the total amount of data stored in the memory of the device can be substantially reduced.

In the embodiment exemplified in FIG. 6, the average range value is calculated as the arithmetic mean of the initial range values (with any "N/A" values continuing for less than the timeout period being considered equal to zero). However, a more sophisticated aggregation algorithm may be used in some embodiments, e.g. as described below.

After logging the data associated with the first interaction to the memory 127, the third Bluetooth tag with ID 2458978 comes within range of the first Bluetooth tag at time 11:01:13, and two advertising messages are detected by the first Bluetooth tag over the following two seconds. The first Bluetooth tag continues to listen for advertising messages from the Bluetooth tag with UUID 2458978 until a predetermined time period (three seconds in the Example shown in FIG. 5) has elapsed, at which point the first Bluetooth tag determines that this interaction has also completed.

Again, only the total contact time and an average range for this interaction is logged in the memory of the first Bluetooth tag, as shown in Table 302. This process then continues, with the first Bluetooth tag listening for further interactions with the same or further tags, and the data associated with these further interactions is stored in the memory as an accumulated time and average range once each interactions is determined to have completed. Although in the example described in relation to FIG. 3, only one interaction was monitored at a given time, the Bluetooth tags 120 of the contact tracing system 100 may be capable of monitoring the presence of multiple other tags simultaneously, up to a total device limit determined by the available bandwidth of the system.

Corresponding, similar data is recorded on the second and third Bluetooth tags, associated with advertising messages sent from the first Bluetooth tag during the same time period. Any of these tags may later come into contact with a multi-radio mobile device of the contact tracing system and transmit the data associated with a particular interaction between the Bluetooth tags (e.g. the data shown in FIG. 6 for the first Bluetooth tag).

Saving accumulated time and range values from an interaction between two Bluetooth tags to the memories of the Bluetooth tags involved in the interaction allows for a more compact storage of contact data in the memory of the Bluetooth tags, and advantageously allows faster data transfer between Bluetooth tags and mobile devices. However, calculating an arithmetic mean range in this way may not always optimally reflect how the risk of airborne disease transmission between human can be affected both by distance and time.

Some embodiments therefore take a different approach which may improve the usefulness of the proximity data transmitted to the server 130, as well as reducing the total amount of data that needs to be stored on the memory of the Bluetooth tags 120.

When determining the likelihood of transmission of an infectious disease, distance alone is not necessarily the only important metric. For example, a 1 second interaction between two humans at a distance of 70 cm may be less likely to result in disease transmission than a 10 minute exposure at a distance of 1 metre. To determine likelihood of disease transmission, a useful concept is that of exposure, i.e. the total accumulated time individuals spend at a given distance. The applicant has realised that the likelihood of transmission of a disease between two users of a contact tracing system 100 can be effectively represented by a single variable, referred to herein as a "distance-corrected equivalent exposure" (DCEE) value. This can be calculated from BLE RSSI-based range values once an interaction between two Bluetooth tags 120 has completed.

The DCEE is a dimensionless number representing exposure, and is calculated in the tags 120 using a corrected-distance function which is normalised to a chosen distance of equivalent exposure, e.g. 1 metre for 1 second or for 1 minute. Assuming a transmission risk following a normal distribution, an exemplary normal-like corrected-distance kernel function, p(x), used in some embodiments, can be given by:

$$p(x) = \frac{e^{-\frac{1}{2}\left(\frac{x}{\sigma}\right)^2}}{e^{-\frac{1}{2}\left(\frac{1}{\sigma}\right)^2}}$$

where x is a range value in metres between two Bluetooth tags, and where $\sigma$ is the standard deviation of a distribution representing the likelihood of transmission of a particular disease. The standard deviation value will depend on the disease being modelled, i.e. how easily the disease is transmitted; for example how infectious it is and whether it transmits through droplets or in an aerosol.

The DCEE value is then calculated by numerically integrating a time series of these corrected-distance values p(x) over the interaction period (i.e. the period of time in which two Bluetooth tags 120 are in range, up to a timeout period of radio silence after the end of the latest-received advertising message, which could be in the order or second, minutes or hours).

Figure 7:
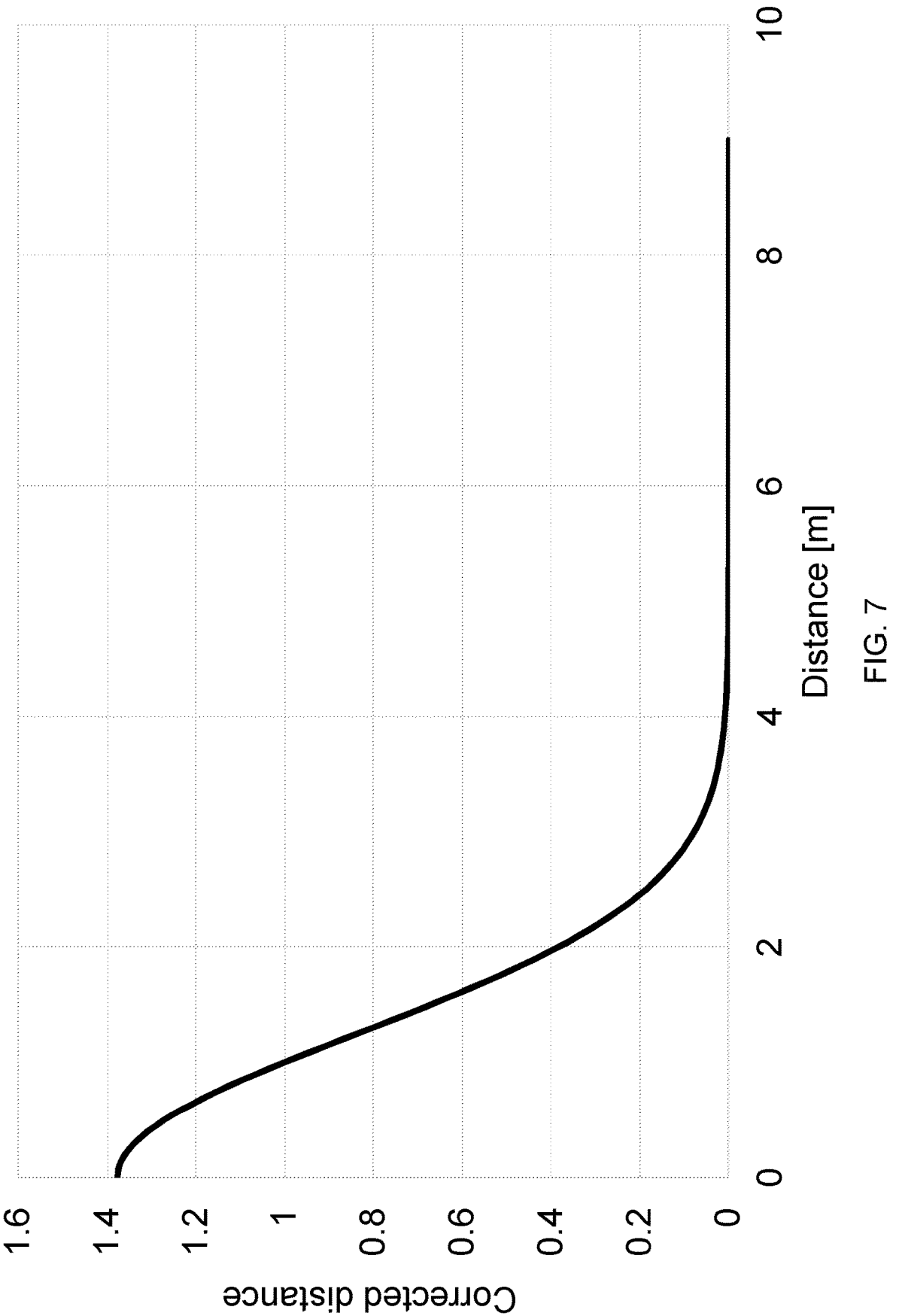
FIG. 7 is a graph that illustrates the calculation of a distance-correlated equivalent exposure value.

FIG. 7 plots an exemplary corrected-distance function p(x), or exposure value, for a range of distance values appropriate for BLE measurements in the case of a disease capable of being represented by a distribution of transmission having a standard deviation of 1.25 metres, normalised to an equivalent distance of one metre (i.e. such that p(1)=1).

In some embodiments, DCEE calculations are carried out by the controller 123 of the Bluetooth tags 120 of the contact tracing system 100, which reduces the amount of data required to be stored in the memory 127 of the Bluetooth tag 120. When a BLE advertisement message is received, the range estimate based on RSSI measurements can be converted from a distance in metres to a corrected-distance value. This may be done by evaluating p(x) numerically, or using a look-up table. A series of these corrected-distance values is then numerically integrated over the period of time in which two Bluetooth tags 120 interact (i.e. until a timeout period has elapsed, with no further advertising messages being received from that advertising tag), to generate a single DCEE value, representing the exposure for the entire interaction. This DCEE value can be logged to the memory 127, along with the UUID of the advertising tag and potentially other data such as a timestamp and/or the total duration of the interaction and/or geographical location data (where available), as proximity data for the particular interaction.

This allows the amount of data to be stored in the memory of the Bluetooth tags 120 (and later the amount of data needing to be transmitted to the mobile device 110) to be substantially reduced, while still providing a meaningful measurement of contact between the humans carrying the two devices. Furthermore, as this value is normalised to a known quantity (e.g. equivalent exposure at 1 metre for 5 seconds or 1 minute), the determination of which particular interactions are important or high risk can be made significantly easier.

The assignment of a DCEE value to each interaction additionally allows a cumulative social exposure value to be calculated for the user of each Bluetooth tag 120, representative of the total exposure of that user to other users of the contact tracing system 100. The aggregation process by which this cumulative value is determined can emphasize the effect of multiple contacts, with interactions between different users of the contact tracing system 100 taking precedence over single long contacts with the same user. For example, as exposure to the same person beyond a certain "full" exposure threshold does not significantly increase the infection risk, the DCEE score assigned to interactions between two particular users may be soft-capped at a particular value.

In addition to reducing the amount of data that needs to be stored on a Bluetooth tag 120 for each tag-tag interaction, the accuracy of the range estimate based on RSSI measurements can be improved in some embodiments by applying a weighting to each RSSI measurement in an interaction, rather than simply calculating a range value as the inverse square or inverse cube of an RSSI value. This may be done whether using the DCEE approach or as simpler averaging approach.

In some embodiments, a range estimate for a first Bluetooth tag 120a relative to a second Bluetooth tag 120b is determined from a series of received BLE advertisement messages sent from the second Bluetooth tag 120b and used to calculate an exposure value for the interaction between the two Bluetooth tags 120. In this time, one or more BLE advertisement messages may have been received by the first Bluetooth tag 120a and registered as an interaction between the two Bluetooth tags 120a, 120b.

To do this, each Bluetooth tag 120 processes each received BLE advertisement message in the following way:
  if the BLE advertisement message is the first message received as part of the interaction for a particular advertising UUID, a new interaction is registered in the memory of the Bluetooth tag 120;
  on receipt of each BLE advertisement message, the first Bluetooth tag 120 determines a timestamp of receipt and a received signal strength indication, RSSI, for the message;
  for each UUID (i.e. for each unique advertising Bluetooth tag), the controller 121 of the receiving Bluetooth tag 120 maintains a respective buffer in RAM with a time window that has a length that is of the order of the length of expected interaction (which could be 30 seconds, or several minutes, or even 2 hours or more); and the controller 121 periodically (e.g. every five seconds) calculates a weighted average range estimate, and an updated exposure value for each advertising Bluetooth tag 120 by:
  (i) calculating a normalised_RSSI value for each new RSS/value in the buffer, inspired by a typical channel model for BLE received signal strength in an indoor environment, e.g.

normalised_RSSI=(RSSI/RSSI_0)−p, where RSS/is a signal strength value output by the Bluetooth radio module in the tag, RSSI_0 is a constant representing the RSSI of a BLE signal transmitted at one metre (this value is normalised for in the method below), and the power p is a constant that depends on the environment and that may be determined empirically, typically being in the range one to three;
  (ii) converting each new normalised_RSS/value to a range value, RSSI_range, using a power law exponent of three; i.e.

$RSSI\_range=(normalised\_RSSI)^{-3}$;

(iii) for each advertising message received after the first advertising message, iteratively calculating a harmonic mean range, $H_n$, by calculating the harmonic mean range of the latest RSSI_range and the preceding calculated harmonic mean range value, $H_{i-1}$, as $$H_i = \cfrac{1}{\left(\dfrac{1}{2} \cdot \dfrac{1}{RSSI\_range_i} + \dfrac{1}{2} \cdot \dfrac{1}{H_{i-1}}\right)}$$

(iv) for each new $H_i$ value, calculating a corrected-distance value $p(H_i)$; and
  (v) for each new harmonic mean range value, calculating or updating the DCEE value, $DCEE_i$, of the interaction by multiplying the most recent harmonic average value, H, by the time difference between the latest advertising message and the most recent previous advertising message (subject to a cap), and adding this value to the latest accumulated DCEE value of the interaction, $DCEE_{i-1}$.

The cap may be such that, if no message has been received for more than a threshold period (e.g. 30 seconds), integration is not performed using the last time stamp, but instead assigning a fixed time period (e.g. 2.5 seconds) instead.

These calculating of the harmonic mean may, in some embodiments, be weighted using different fractions than 0.5, to obtain a desired combination of latency and noise suppression.

The steps (iii) and (iv) could potentially be reversed, such that the corrected-distance function, $p(x)$, is applied to the RSSI ranges before calculating the harmonic mean. More generally, these steps may be modified in various ways in different embodiments.

As RSSI measurements are highly dependent on the angle between the Bluetooth tags 120, they are typically significantly more accurate at short distances. Using the harmonic mean range therefore improves the accuracy of BLE range measurements by giving more weight to advertising messages received from Bluetooth tags 120 in closer proximity.

Note that the harmonic mean range values may not be particularly accurate estimates of the true geometric range between two Bluetooth tags 120, but it is nevertheless still useful for estimating the proximity of the Bluetooth tags 120.

Calculating the DCEE value of the interaction as described above allows interactions between Bluetooth tags 120, and between tags 120 and smartphones 110, to be recorded in a way which allows optimised storage of data by reducing each interaction to a single value representing an equivalent exposure risk associated with the interaction.

Such DCEE calculations may also be performed for interactions between mobile entities (tags 120 and mobile devices 110) and fixed entities (beacons 120 and gateways 110) of the system 100. Although, in this case, the values are not indicative of an exposure risk between two people, they may nevertheless provide a useful measure of the proximity and duration of proximity of a user to a location at which a beacon 120 or gateway 110 is fixed. This can be useful for determining approximately where in an environment a particular interaction between two users occurred—e.g. by identifying a further interaction between one or both users and a fixed beacon or gateway, occurring within a predetermined maximum time interval from the user-to-users interaction. This may allow congested and/or high-risk areas to be identified (e.g. areas where high numbers of interactions occur), which may help inform environmental design or management decisions and/or help inform individual user decision-making.

It will be appreciated by those skilled in the art that the invention has been illustrated by describing one or more specific embodiments thereof, but is not limited to these embodiments; many variations and modifications are possible, within the scope of the accompanying claims. In particular, while a system 100 has been described for use in recording proximity between human users for epidemiological purposes, the ideas disclosed herein are not limited only to this use case, and could be applied to other areas also.

The invention claimed is:

1. A method for determining proximity, the method comprising:
sending a wireless signal from a first mobile tag of a plurality of mobile tags, the wireless signal communicating identification information associated with the first mobile tag;
receiving the wireless signal at a second mobile tag of the plurality of mobile tags;
in response to receiving the wireless signal, storing proximity data comprising the identification information in a memory of the second mobile tag;
sending the proximity data from the second mobile tag to a mobile communication device using a first wireless protocol;
receiving the proximity data at the mobile communication device using the first wireless protocol;
storing the proximity data in a memory of the mobile communication device;
sending the proximity data from the mobile communication device to a server using a second wireless protocol, different from the first wireless protocol; and
storing the proximity data in a memory of the server.

2. The method of claim 1, wherein the wireless signal is a radio signal.

3. The method of claim 1, wherein the wireless signal is a Bluetooth™ advertising message.

4. The method of claim 1, wherein the first wireless protocol is a Bluetooth™ radio protocol and wherein the second wireless protocol is a WiFi™ or cellular radio protocol.

5. The method of claim 1, further comprising using the proximity data on the server to identify a set of the mobile tags that have been in proximity with a particular mobile tag during a time window.

6. The method of claim 1, further comprising:
determining that a user of the first mobile tag is a user of interest;
determining identification information associated with the first mobile tag;
identifying proximity data in the memory of the server that comprises the identification information; and
determining, from the proximity data, the identification information associated with one or more mobile tags that have received the wireless signal from the first tag.

7. The method of claim 6, further comprising:
identifying one or more users of the one of more mobile tags; and
sending a notification to each identified user.

8. A system for determining proximity, the system comprising:
a plurality of mobile tags; and
a mobile communication device,
wherein each of the mobile tags is configured to:
send wireless signals communicating identification information associated with the mobile tag;
receive a wireless signal from another of the mobile tags, the wireless signal communicating identification information associated with the other mobile tag;
in response to receiving the wireless signal, store proximity data comprising the received identification information in a memory of the mobile tag; and
send the proximity data to the mobile communication device using a first wireless protocol, and wherein the mobile communication device is configured to:
receive the proximity data using the first wireless protocol;
store the proximity data in a memory of the mobile communication device; and
send the proximity data to a server using a second wireless protocol, different from the first wireless protocol.

9. The system of claim 8, further comprising the server.

10. The system of claim 8, wherein the mobile tags contain no long-range wireless interface and no wired network interface, and wherein the mobile tags are not able to send or receive Internet Protocol (IP) packets.

11. The system of claim 8, wherein each mobile tag is configured to determine a received signal strength indicator value for a wireless signal received from another of the mobile tags, and is configured to determine the proximity data from one or more determined received signal strength indicator values.

12. The system of claim 8, wherein each mobile tag is configured to calculate a range value as a harmonic mean of a plurality of values derived from a plurality of received signal strength indicator values when determining the proximity data.

13. The system of claim 8, wherein each mobile tag is configured to calculate an exposure value for another of the mobile tags, based on a plurality of wireless signals received from the other mobile tag over an interaction time window.

14. The system of claim 13, wherein each mobile tag is configured to calculate the exposure value by integrating, over time, a function of a plurality of range values derived from a plurality of received signal strength indicator values for the received wireless signals.

15. The system of claim 14, wherein the function is a Gaussian curve centered at zero range.

16. The system of claim 8, wherein the proximity data further comprises identification information associated with the mobile device tag that received the wireless signal.

17. The system of claim 8, further comprising a static beacon, the static beacon being configured to send wireless signals communicating identification information associated with the static beacon.

18. The system of claim 17, wherein each of the mobile tags is configured to:

receive a wireless signal from the static beacon communicating identification information associated with the static beacon;

in response to receiving the wireless signal, store static-beacon proximity data comprising the identification information associated with the static beacon in a memory of the mobile tag; and send the static-beacon proximity data to the mobile communication device using the first wireless protocol.

19. The system of claim 8, further comprising a static gateway, the static gateway being configured to:

receive proximity data from a mobile tag using the first wireless protocol;

store the received proximity data in a memory of the static gateway; and send the received proximity data to the server using the second wireless protocol, different from the first wireless protocol.

20. A mobile tag for use in a system for determining proximity, the mobile tag being configured to:

send wireless signals communicating identification information associated with the mobile tag;

receive a wireless signal from a second mobile tag, the wireless signal communicating identification information associated with the second mobile tag;

in response to receiving the wireless signal, store proximity data comprising the received identification information in a memory of the mobile tag; and send the proximity data to a mobile communication device using a first wireless protocol.

* * * * *